(12) United States Patent
Chen et al.

(10) Patent No.: US 9,465,478 B2
(45) Date of Patent: Oct. 11, 2016

(54) DRIVING ALGORITHM ON PROJECTED CAPACITANCE TOUCH

(71) Applicant: Inputek Co. Ltd., Hsinchu County (TW)

(72) Inventors: Chi Chin Chen, Hsinchu County (TW); Wen Yi Lee, Hsinchu County (TW); Tse Yen Lin, Hsinchu County (TW); Chia Wei Wu, Hsinchu County (TW)

(73) Assignee: INPUTEK CO., LTD., Hsinchu County (TW)

( * ) Notice: Subject to any disclaimer, the term of this patent is extended or adjusted under 35 U.S.C. 154(b) by 0 days.

(21) Appl. No.: 14/517,493

(22) Filed: Oct. 17, 2014

(65) Prior Publication Data

US 2016/0110007 A1     Apr. 21, 2016

(51) Int. Cl.
  *G06F 3/045*   (2006.01)
  *G06F 3/041*   (2006.01)
  *G06F 3/044*   (2006.01)

(52) U.S. Cl.
  CPC ............. *G06F 3/0416* (2013.01); *G06F 3/044* (2013.01)

(58) Field of Classification Search
  CPC ................................ G06F 3/044; G06F 3/0416
  See application file for complete search history.

(56) References Cited

U.S. PATENT DOCUMENTS

| | | | |
|---|---|---|---|
| 2009/0025987 A1* | 1/2009 | Perski | G06F 3/041 178/18.03 |
| 2011/0074728 A1* | 3/2011 | Liu | G06F 3/0412 345/174 |
| 2011/0157079 A1* | 6/2011 | Wu | G06F 3/044 345/174 |
| 2012/0075240 A1* | 3/2012 | Kida | G06F 3/044 345/174 |
| 2013/0009651 A1* | 1/2013 | Benkley, III | G01N 27/04 324/649 |
| 2014/0197845 A1* | 7/2014 | Ko | G01R 31/2829 324/537 |
| 2015/0035794 A1* | 2/2015 | Zhitomirskiy | G06F 3/044 345/174 |

\* cited by examiner

*Primary Examiner* — Lixi C Simpson
(74) *Attorney, Agent, or Firm* — Ming Chow; Sinorica, LLC

(57) ABSTRACT

A projected capacitive touch panel comprises a touch control integrated circuit, sensing electrodes, driving electrodes, a MCU, a AC signal generator, a sensing bus, and a driving bus. The driving electrodes are made of high resistance material. One driving electrodes is selected by MCU based on firmware program as selected driving electrode. A low voltage AC signal is generated by the AC signal generator. The AC signal is transmitted to the selected driving electrode and its adjacent two driving electrodes via the driving bus. The rest of driving electrodes are connected to a fixed DC level. Providing the same AC signal to three driving electrodes simultaneously can induce higher sensing signal in the sensing electrodes.

9 Claims, 5 Drawing Sheets

DRIVING ALGORITHM ON PROJECTED CAPACITANCE TOUCH

FIELD OF THE INVENTION

The present invention relates generally to a capacitive touch system. More specifically, it is a driving algorithm design, which is suitable for the high resistance driving electrodes.

BACKGROUND OF THE INVENTION

The touch screen technology has been widely used recent years in computing devices, such as mobile phones, notebook computers, and variety of portable electronic devices (such as game console, multimedia players, and the like). With this technology used in the user-interface, interaction between user and the computing device become more convenient and efficiency. Instead of using a mouse, keyboard, or any other intermediate devices, users can interact with what is displayed directly. Some touch screen can not only controlled through single or multi-touch gestures but also detect specially coated gloves and stylus.

Among a variety of different touch screen technologies, capacitive touch panels became more popular after the releases of new portable electronic devices. Unlike the surface capacitive touch panels can only detect single touch, the projected capacitive touch (PCT) panels are capable of implementing multi-finger touch detection. The PCT technology makes multi-gesture control possible like enlarge, narrow, rotate, or drag a pattern on a projected capacitive touch panel simultaneously.

Projected capacitive touch screens are made up with a matrix of rows and columns of resistive transparent conductive material such as indium tin oxide (ITO) layered on sheet of glass. The two axes of conductive material are driving electrodes and sensing electrodes. Capacitance exists among them.

As the human body is also an electrical conductor, touching the surface of the display results in a distortion of the screen's electrostatic field. There is a change in the level of capacitance. The chips measures cross-capacitive in the X-axis and Y-axis of a projected capacitive touch screen structure and for every intersection of the drive/sense lines the capacity change is interpreted and converted to XY coordinates that correspond to the actual touch position.

One of the most important cost drivers in touch screen design is the border area. Unlike traditional analog touch screens that have four or five signals lines, projected capacitive touch screens often have forty or more connections; this is due to each row and column needing at least one connection requiring the border to extend past the active area of the touch screen.

The driving IC of projected capacitive touch screen contains three sections that are driving, sensing, and micro-programmed control unit (MCU). There are two main driving modes in the driving section. One is only the selected driving electrode will be forced a high voltage AC signals and other driving electrodes are connected to a fixed DC level (ground, VDD, or other DC level). The IC process is complex and power consumption is high of this mode. The other mode is to provide a 5V AC signals to the selected driving electrode and other driving electrodes are connected to floating signals. Although the IC process is simpler, it will become a big problem for the determination that whether the sensing node on that sensing electrode has been touched and additional calculation need processed by micro-programmed control unit (MCU). The two driving modes mentioned above could not use if driving electrodes have high resistance because of the attenuation of signals caused by parasitic capacitance.

In this technology, normally the two driving electrodes adjacent to the selected electrode are provided the same AC signals as that to the selected one. While in prior design, only selected driving electrodes (N) will force AC signals, others driving electrodes are connected to a fixed DC level (ground, VDD, or other DC level). In this technology, the selected electrode (N) and its adjacent driving electrodes (N−1, and N+1) have the same AC signals, other driving electrodes are connected to a fixed DC level. This novel driving algorithm can significantly minimize the parasitic capacitance so a lower AC voltage can be used as driving signals at driving electrodes have high resistance. In this case, the present invention is able to apply to a large-scale touch panel, reduce the material cost, complexity of IC process, and power consumption.

DETAIL DESCRIPTION OF THE INVENTION

All illustrations of the drawings and description of embodiments are for the purpose of describing selected versions of the present invention and are not intended to limit the scope of the present invention.

Figure 1:
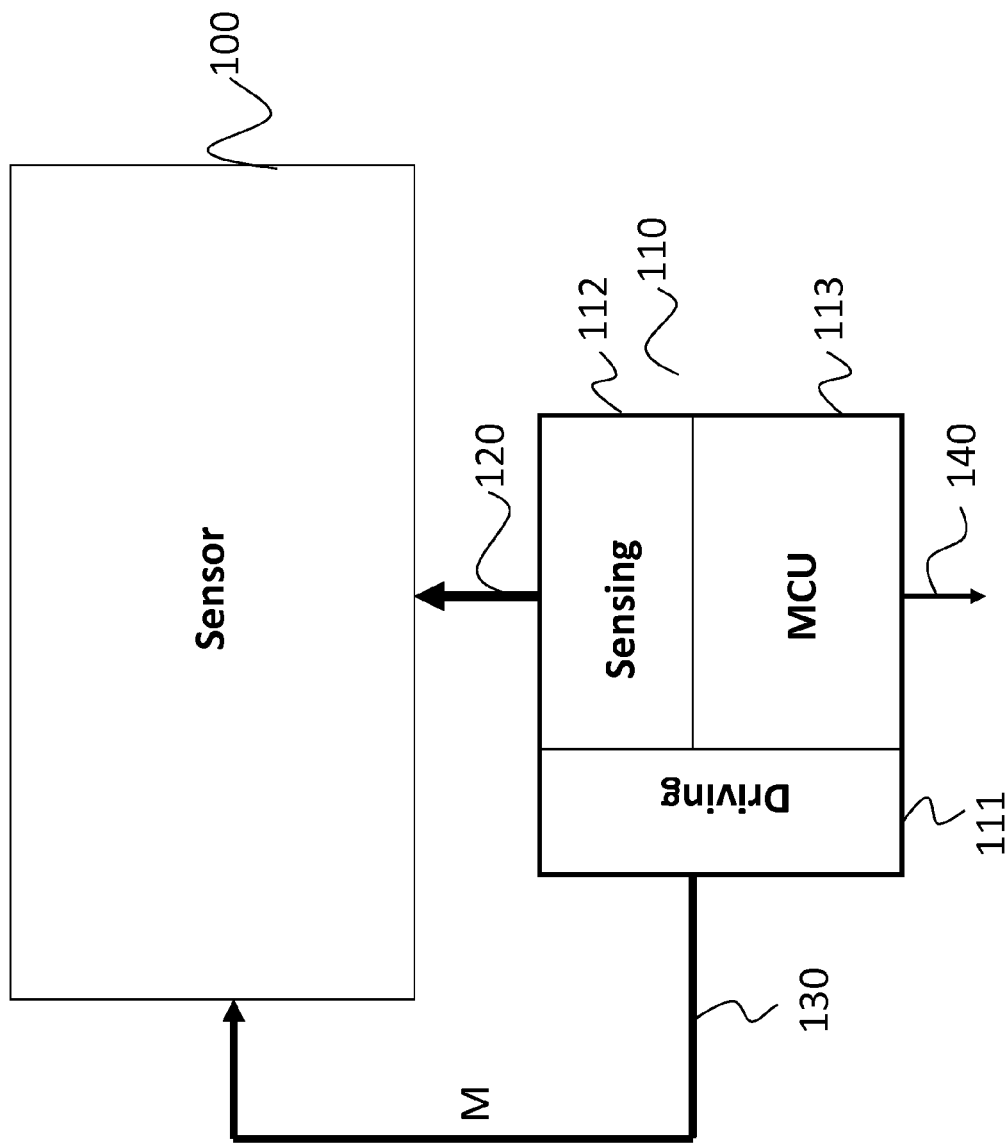
FIG. 1 is a schematic illustration of the architecture of projected capacitive touch system.

The present invention comes up with a novel driving algorithm on projected capacitive touch panel. As shown in FIG. 1, there are three main sections in a projected capacitive touch panel touch control IC 110; they are driving IC 111, sensing IC 112, and micro-programmed control unit (MCU) 113. Wherein the sensing IC 111 and the driving IC 112 are connected to a sensor 100 through a sensing bus 120 and a driving bus 130 respectively. The micro-programmed control unit (MCU) 113 will execute the firmware program based on touch algorithm to provide driving signal and select driving electrode. The micro-programmed control unit (MCU) then connected to a system through system bus 140 and the touch coordinates will be calculated according to typical algorithm based on the sensing signals send from sensing electrodes. In order to achieve the main objective of the present invention, the driving algorithm has been improved. One is to provide the two driving electrodes adjacent to the selected electrodes the same AC driving signals as that provided to the selected one by the micro-programmed control unit (MCU) 113. Surrounding by the same AC signals, the signals in the selected driving electrode is protected thus the signals attenuation at the end of the driving electrode caused by parasitic capacitance will be minimized. Moreover, the other difference is that beside the three electrodes have the same AC signals, while other driving electrodes are connected to a fixed DC level (ground, VDD, or other DC level). Ground level is used in this description as an example and is not mean to limit the scope of application.

The design of the present invention is associated with a few significant beneficial effects. The improved driving algorithm in the present invention is capable to use driving electrodes with high resistance, which makes it suitable for the large size touch panel devices and lower the material cost. In the present invention, the selected electrode and its adjacent driving electrodes have the same signals. Therefore, the parasitic capacitance between the selected electrode and its parallel electrodes is reduced, which lead to a reducing of signals attenuation in the selected electrode. In this case, a low voltage AC power can be used which can reduce the power consumption. The present invention can also ensure a high accuracy of determination of whether a touch occurred. Besides, the IC manufactory process and the circuit are simple.

Further, with the advantages of the invention, the driving electrodes are specifically designed as the high resistance one. Usually, a higher resistance and parallel parasitic capacitance (C) on driving electrode (R), the more signals is weaken. Especially in a large size touch panel, the driving electrodes on the ITO layer will be very long. Therefore, the signals attenuation will be higher in such a case. With the reduction of parasitic capacitance, the resistance on driving electrode can increase accordingly while the signals strength is not weakened. Moreover, the touch panel in the present invention is very suitable for certain popular new materials, such as the Nano-carbon tube and conductive polymer. The Nano-carbon tube and conductive polymer have low cost but high resistance characteristic. The present invention can use these materials to do touch panel design, while the previous products are failed using them.

Figure 2:
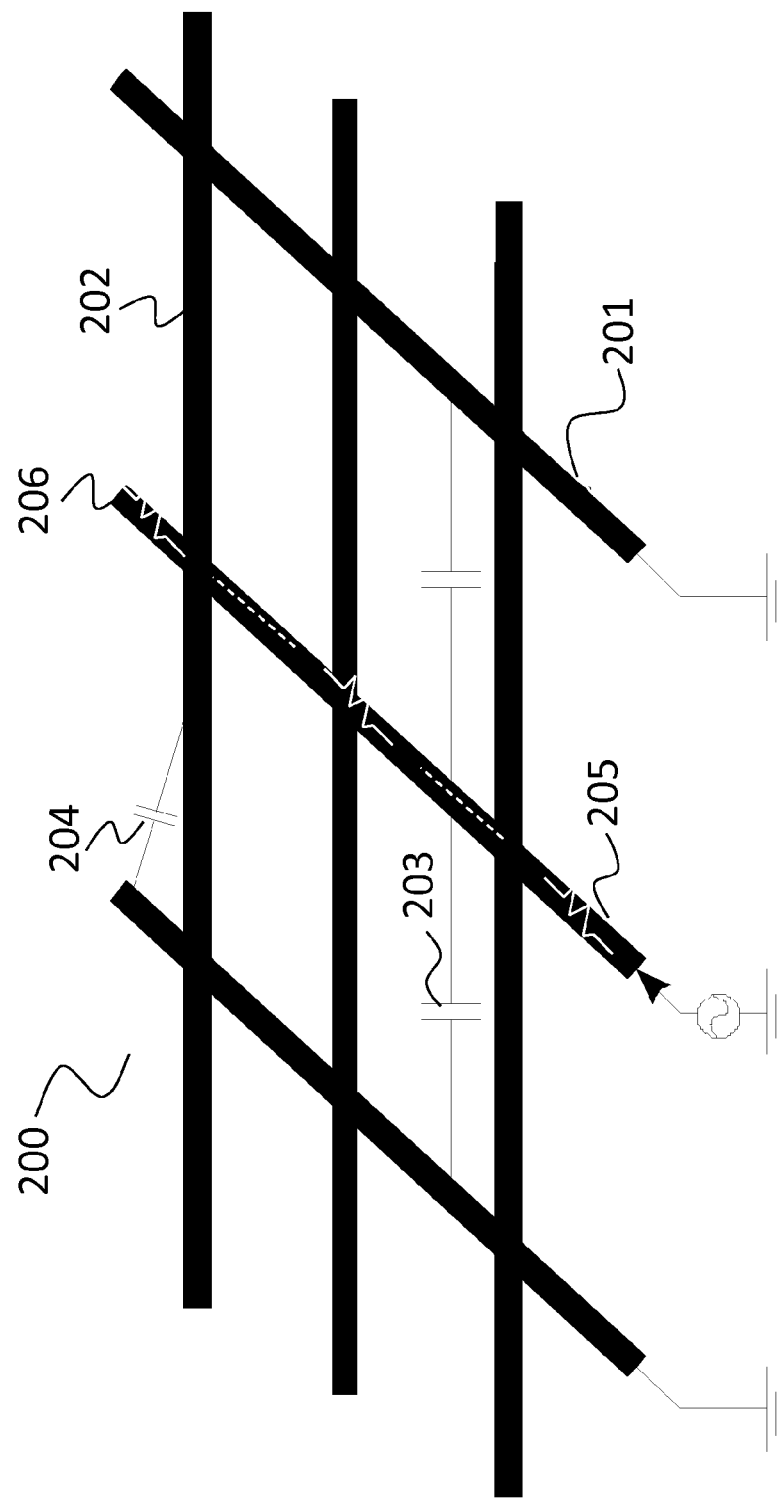
FIG. 2 is a schematic illustration of the parasitic capacitance exists between two adjacent driving electrodes and between driving electrode to sensing electrode.

In the common model of the projected capacitive touch panel operation as shown in FIG. 2, vertical and horizontal conductive layers compose PCT electrodes 200. Such a structure is actually a capacitor. Either vertical or horizontal electrodes can be act as driving electrodes 201, while the perpendicular electrodes will be sensing electrodes 202. Thus, if a signals is transmitted from the driving electrodes 201, parasitic capacitance are always exist between two adjacent driving electrode, usually called Cdd 203, and between driving electrode to sensing electrode, usually called Cds 204, which is due to the dielectric coupling effect. When a finger is touched on cross point, the capacitor is changed (dielectric capacitor plus human finger capacitor), the coupling voltage on vertical will be small than un-touched. This is the operation model on a common PCT.

The AC signals in the selected driving electrode 205 will be decayed because of increasing of driving electrode resistance R 206 and C (Cdd 203+Cds 204) that in it. When the touch panel size increases from 4 inches to 5 inches even 15 inches, 24 inches, or 55 inches the R and Cdd+Cds will increase as panel increase. When the AC signals cannot be recognized, the panel size will be limited. In the present invention, the two adjacent driving electrodes has the same AC signals as the selected electrode, the Cdd 203 will be minimized to a very small amount, thus the R 206 can be increase as Cdd reduced. Therefore, the major advantage of high resistance driving electrode is it capable of big size touch panel.

Figure 3:
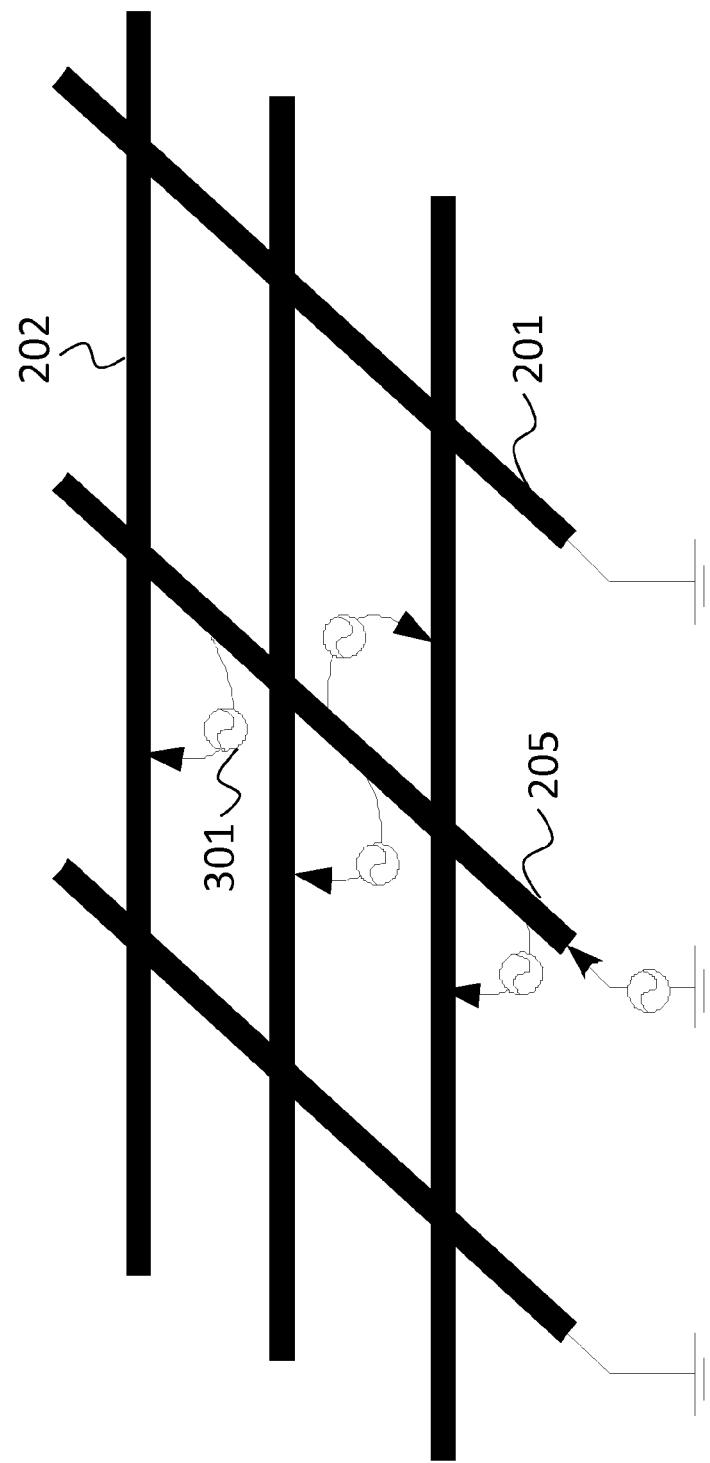
FIG. 3 is a schematic illustration the coupling signals between driving electrodes and sensing electrodes.

The AC signals in the selected driving electrode 205 has some coupling path including between two adjacent driving electrodes (left and right) and between all sensing electrodes 202. The coupling signals in sensing electrodes 202 are considered as effective signals 301, as illustrated in FIG. 3.

In prior designs, in order to increase the coupling signals in sensing electrodes 202, increasing the voltage in the selected driving electrode 205 is a quick solution while the power consumption will increase as well. In the present invention, since two adjacent driving electrodes and the selected driving electrode 205 have the same AC signals and AC signals decay in the selected driving electrode 205 is small, the all AC signals in selected driving electrode 205 will couple to sensing electrodes 202. Meanwhile, the adjacent driving electrodes will couple some signals to sensing electrodes 202 to help the sensing electrodes 202 has high coupling signals. Therefore, the present invention can use 5V (low voltage) to drive the driving electrodes 201 and the power consumption is reduced accordingly. Further, in most application, source no great than 5V is widely used. Almost all of IC foundries have 5V source related process on different technology (0.18 um, 0.13 um, 90 nm, etc). Using 5V as driving source, the IC manufacture process has more flexibility on choosing foundries and technologies. Besides, in IC manufacture process, different voltage sources have different design rules and masks to fit demand of reliability and device voltage tolerance. The higher the voltage source, the more complex the IC manufacture process is. Therefore, using low voltage driving voltage source can simplify the IC manufacture process.

Figure 4:
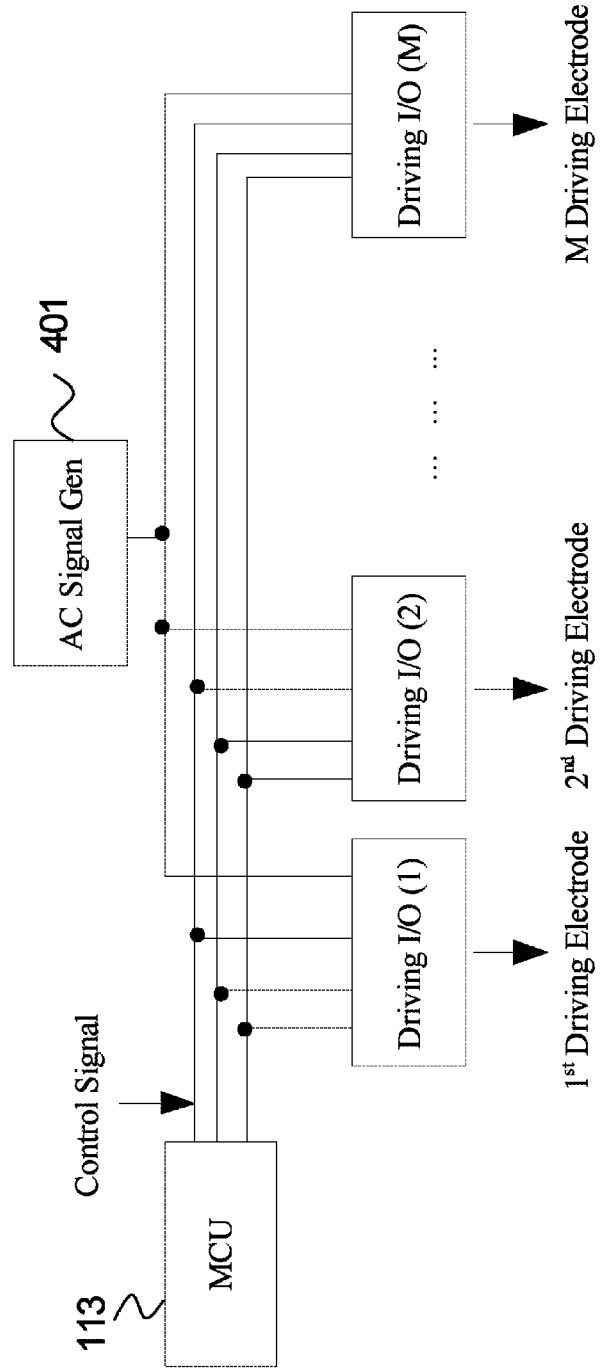
FIG. 4 is a schematic illustration of the structure of control signal sending.

As illustrated in FIG. 4, within the present invention, the signals sent to the selected driving electrode 205 and its adjacent two driving electrodes and the connection of all other driving electrodes to the fixed DC level are controlled by the micro-programmed control unit (MCU) 113 firmware and software program based on touch algorithm. The algorithm will determine which electrodes will be selected to provide driving signal, provide Pulse Width Modulation (PWM) signal to the selected driving electrode 205, and control latency time on each electrode. Latency time depends on charge time of the selected driving electrode 205 and sensing electrodes 202 raw data processing time of sensing IC. Some logic circuits are programmable as AC signals generator 401. The input of the AC signals generator is square waveform. The AC signals generator will output triangle or sinusoidal waveform directly to the selected driving electrode 205. To illuminate the present invention, an assumption is made as an example that the total number of driving electrodes 201 is M. The driving electrode will select from the first (number one) to the last (number M) by program scan algorithm.

For a touch panel device following the design disclosed in the present invention, it would operate in the way described below. A touch panel comprises M driving electrodes 201 and N sensing electrodes 202 in its touch panel. The selected driving electrode 205 is selected from number one to number M controlled by the micro-programmed control unit (MCU) 113.

Figure 5:
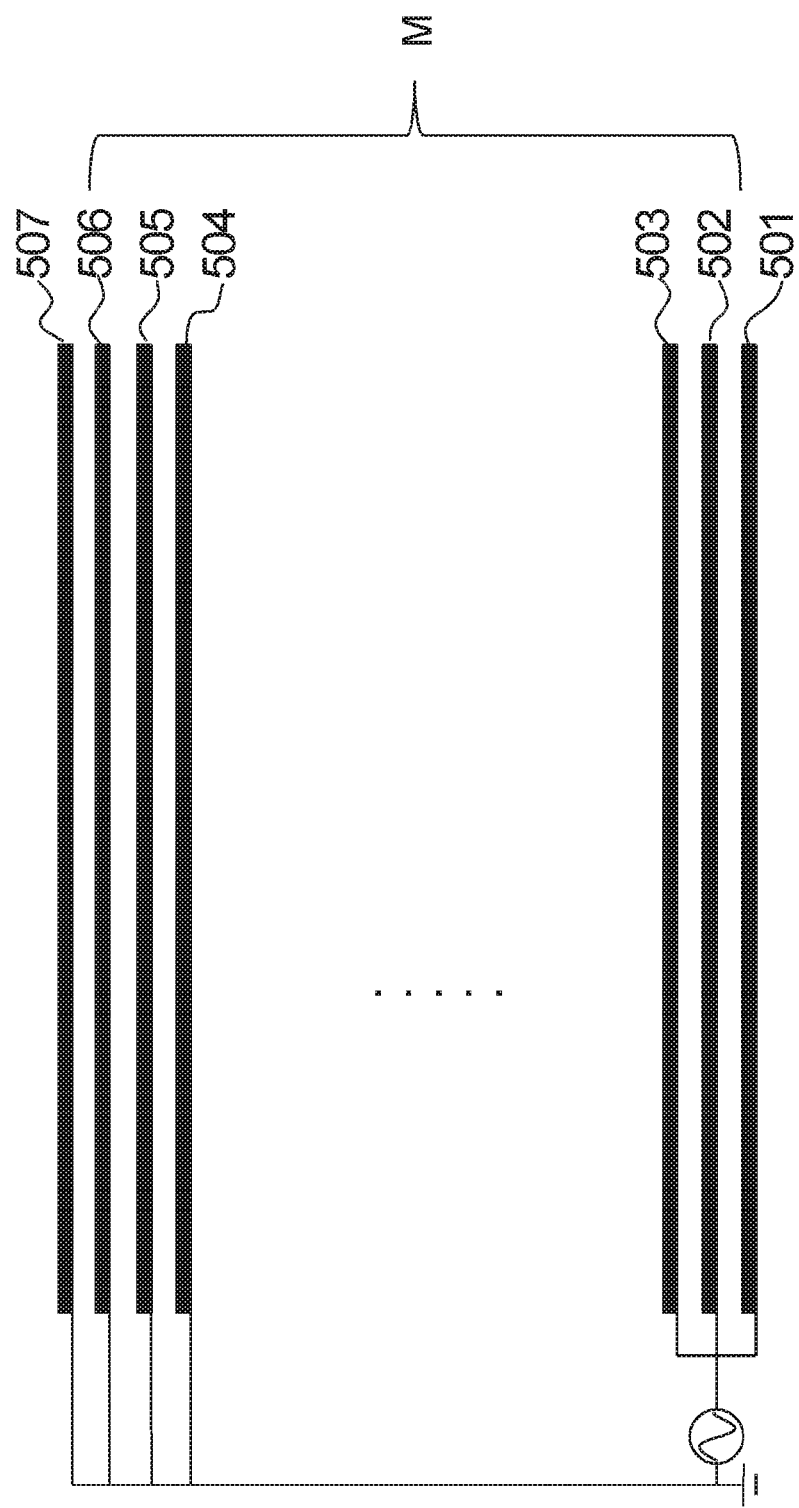
FIG. 5 is a schematic illustration of the signal providing method of driving electrodes.

During the operation, in FIG. 5, when the first driving electrode 502 is selected, the micro-programmed control unit (MCU) 113 and the AC signal generator 401 provide AC signal with specific frequency synergistically to it as the driving signal source of driving electrodes. The zero driving electrode 501 (the dummy driving electrode closed to the first electrode 502) and the second driving electrode 503 are provided the same driving signal. While the third driving electrode to the $M^{th}$ driving electrode (the last driving electrode) 506 connect to ground level. When the second driving electrode 503 is selected, the micro-programmed control unit (MCU) 113 and the AC signal generator 401 provide AC signal with specific frequency synergistically to it as the driving signal source of driving electrodes. The first driving electrode 502 and the third driving electrode are provided the same driving signal. While the forth driving electrode to the M$^{th}$ driving electrode (the last driving electrode) 506 connect to ground level. Driving electrodes are selected one by one until the M$^{th}$ driving electrode 506 is selected. The micro-programmed control unit (MCU) 113 and the AC signal generator 401 provide AC signal with specific frequency synergistically to it as the driving signal source of driving electrodes. The M−1$^{th}$ driving electrode 505 and the M+1$^{th}$ driving electrode 507 (the dummy driving electrode closed to the M$^{th}$ driving electrode 506) are provided the same driving signal. While the first driving electrode 502 to the M−2$^{th}$ driving electrode 504 connect to ground level. The LCD display area on touch sensor called Active Area (AA), the bezel area on touch sensor is covered by black mask cannot be touched. In the present invention, the zero driving electrode 501 and the M+1$^{th}$ driving electrode 507 are located in bezel area closed to the first driving electrode 502 and the M$^{th}$ driving electrode 506 respectively.

The sensing electrodes 202 is then scanned driving electrodes from the first to the M$^{th}$, combining with all sensing electrodes signals variation on each driving electrode, the touch position will be calculated by specific algorithm.

Although the invention has been explained in relation to its preferred embodiment, it is to be understood that many other possible modifications and variations can be made without departing from the spirit and scope of the invention as herein described.

What is claimed is:

1. A projected capacitive touch panel architecture, comprising
   a sensor;
   a touch control integrated circuit;
   a sensing bus;
   a driving bus;
   said touch control integrated circuit comprising a sensing IC, a driving IC, and a micro-programmed control unit (MCU);
   said sensor comprising a plurality of sensing electrodes, and a plurality of driving electrodes;
   said driving electrodes comprises a selected driving electrode;
   said selected driving electrode being selected by said micro-programmed control unit (MCU) from said driving electrodes;
   two of said driving electrodes adjacent to said selected driving electrode being selected by said micro-programmed control unit (MCU) from said driving electrodes;
   said plurality of driving electrodes parallel to each other;
   said plurality of sensing electrodes parallel to each other;
   said plurality of driving electrodes and said plurality of sensing electrodes are vertical to each other;
   a quantity of said sensing electrodes being N;
   a quantity of said driving electrodes being M+2;
   said micro-programmed control unit (MCU) select said selected driving electrode from a second driving electrode to a second from the last driving electrode cyclically;
   said micro-programmed control unit (MCU) select M of said driving electrodes within one cycle as selected driving electrode;
   said driving IC comprising an AC signal generator, said AC signal generator inputs square waveform from said micro-programmed control unit (MCU), and said AC signal generator outputs voltage no greater than 5V;
   said sensing bus connecting said sensing IC to said sensing electrodes;
   said driving bus connecting said driving IC to said driving electrodes;
   said driving electrodes being high resistance conductive material;
   said selected driving electrode being connected to said AC signal generator by said driving bus;
   two driving electrodes adjacent to said selected driving electrode being connected to said AC signal generator by said driving bus; and
   driving electrodes not being connected to said AC signal generator being connected to a fixed DC level.

2. The projected capacitive touch panel architecture of claim 1, wherein
   said driving electrodes being Nano-carbon tubes.

3. The projected capacitive touch panel architecture of claim 1, wherein
   said driving electrodes being conductive polymer.

4. The projected capacitive touch panel architecture of claim 1, wherein
   said driving electrodes being high sheet resistance ITO.

5. A projected capacitive touch panel architecture, comprising
   a sensor;
   a touch control integrated circuit;
   a sensing bus;
   a driving bus;
   said touch control integrated circuit comprises a sensing IC, a driving IC, and a micro-programmed control unit (MCU);
   said sensor comprising a plurality of sensing electrodes, and a plurality of driving electrodes;
   said driving IC comprises a AC signal generator;
   said driving electrodes comprises a selected driving electrode;
   two of said driving electrodes adjacent to said selected driving electrode being selected by said micro-programmed control unit (MCU) from said driving electrodes;
   said plurality of driving electrodes parallel to each other;
   said plurality of sensing electrodes parallel to each other;
   said plurality of driving electrodes and said plurality of sensing electrodes are vertical to each other;
   a quantity of said sensing electrodes being N;
   a quantity of said driving electrodes being M+2;
   said selected driving electrode being selected by said micro-programmed control unit (MCU) from said driving electrodes;
   said micro-programmed control unit (MCU) select said selected driving electrode from the second driving electrode to the second from the last driving electrode cyclically; and
   said micro-programmed control unit (MCU) select M of said driving electrodes within one cycle as selected driving electrode.

6. The projected capacitive touch panel architecture of claim 5, wherein
   said AC signal generator inputs square waveform from said micro-programmed control unit (MCU); and
   said AC signal generator outputs voltage no greater than 5V.

7. The projected capacitive touch panel architecture of claim 5, wherein
   said sensing bus connecting said sensing IC to said sensing electrodes;

said driving bus connecting said driving IC to said driving electrodes;
said selected driving electrode being connected to said AC signal generator by said driving bus;
two driving electrodes adjacent to said selected driving electrode being connected to said AC signal generator by said driving bus; and
driving electrodes not being connected to said AC signal generator being connected to a fixed DC level.

8. The projected capacitive touch panel architecture of claim 5, wherein said driving electrodes being high resistance conductive material.

9. The projected capacitive touch panel architecture of claim 8, wherein
said driving electrodes being Nano-carbon tubes;
said driving electrodes being conductive polymer; or
said driving electrodes being high sheet resistance ITO.

\* \* \* \* \*